No. 743,127.

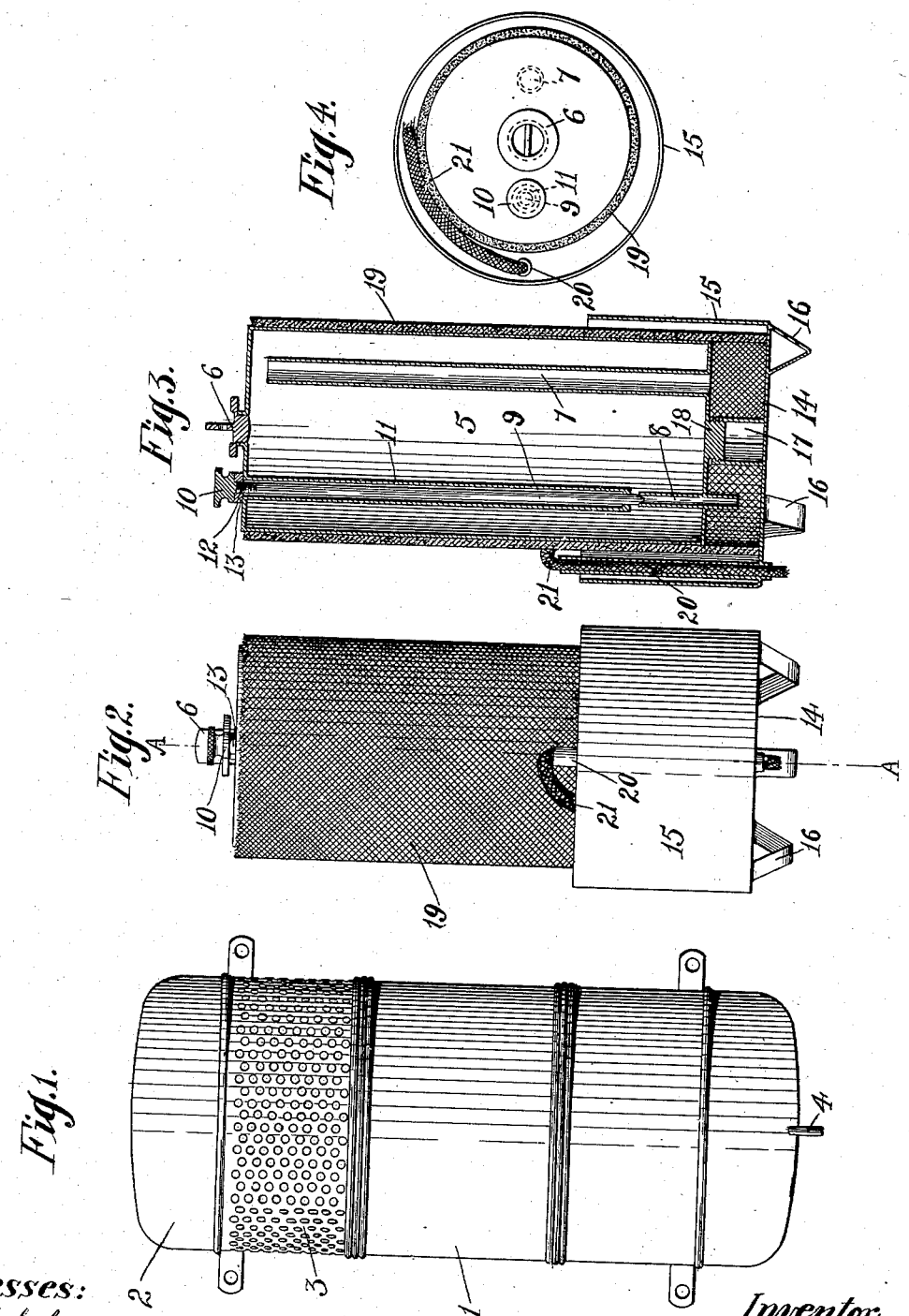

Patented November 3, 1903.

UNITED STATES PATENT OFFICE.

FRANKLYN M. WISE, OF NEW YORK, N. Y., ASSIGNOR TO WEST DISINFECTING COMPANY, OF NEW YORK, N. Y., A CORPORATION OF NEW YORK.

DISINFECTING APPARATUS.

SPECIFICATION forming part of Letters Patent No. 743,127, dated November 3, 1903.

Application filed October 31, 1902. Renewed September 21, 1903. Serial No. 174,116. (No model.)

*To all whom it may concern:*

Be it known that I, FRANKLYN M. WISE, a citizen of the United States, and a resident of the borough of Manhattan, in the city and State of New York, have invented a new and useful Disinfecting Apparatus, of which the following is a specification.

My invention relates to disinfecting apparatus, and has for its object to provide a device which may be readily refilled without taking the apparatus apart and a device in which the several parts are made removable for various purposes.

A further object is to provide certain improvements in the construction, form, and arrangement of the several parts whereby the efficiency of the apparatus is increased and its life lengthened.

A practical embodiment of my invention is represented in the accompanying drawings, in which—

Figure 1 represents in front elevation the casing for containing the device. Fig. 2 represents a view in side elevation of the device. Fig. 3 is a transverse central section taken in the plane of the line A A of Fig. 2, and Fig. 4 is a top plan view of the device.

The casing of the disinfecting apparatus is denoted by 1, and it may be made of any desired shape and size. This casing is provided with a suitable removable cover 2, and is also provided with a perforated portion 3 and a drip-tube 4.

The reservoir for the disinfecting fluid is denoted by 5 and is here shown in the shape of a cylinder having its top and bottom closed. The top of the reservoir is provided with a removable air-tight filling-cap 6, having a screw-threaded engagement with the filling-hole of the reservoir.

An air-feed tube 7 leads from the bottom of the reservoir 5 up to a point in close proximity to its top for admitting air to the space between the top of the liquid and the top of the reservoir whenever the bottom of the said tube is brought into communication with the air by the lowering of the liquid within the dispensing-cup, to be hereinafter described.

A liquid-outlet tube 8 extends a short distance above and below the bottom of the reservoir 5, and the upper end of the said tube is opened and closed by a needle-valve 9, the operating-handle 10 therefor being located above the top of the said reservoir.

The rod which forms the needle-rod 9 is preferably housed within a tube 11, projecting downwardly from the top of the reservoir 5 to a point near the upper end of the outlet-tube 8. This tube 11 serves as a guide for the valve-rod 9 as it is screwed up and down and also serves to protect a considerable portion of the said rod from the action of the disinfecting fluid within the reservoir. This valve is raised and lowered for opening and closing the outlet 8 by providing the valve-rod with a screw-threaded portion 12 adjacent to the handle 10, which engages a projection 13—such, for instance, as a nut permanently secured to the top of the reservoir.

The fluid-dispensing cup comprises a bottom 14, a cylindrical wall 15, uprising therefrom, and a plurality of legs 16 for supporting the cup within the casing 1 of the apparatus a short distance above the bottom of the casing. This dispensing-cup is of greater diameter than the reservoir, so as to leave a space between the reservoir and the walls of the cup when the reservoir is in position therein.

The reservoir is removably secured within the cup with the bottom of the reservoir spaced a distance above the bottom of the cup by the following means: A screw-threaded socket 17 extends upwardly within the cup from its bottom 14, and the bottom of the reservoir is provided with a depending screw-threaded plug 18, fitted to be screwed into the socket 17.

A tubular diffusing-wick 19 envelops the reservoir 5, and the bottom of the said wick is brought down into the bottom or lower portion of the dispensing-cup. A dispensing-tube 20 extends upwardly from the bottom of the cup adjacent to one of its walls to a point above the top of the cup. This tube also preferably extends a slight distance below the bottom 14 of the said cup. A wick 21 is located within the tube 20 and extends over into the lower portion of the cup for conveying the fluid in small quantities from the interior of the cup into the bottom of the casing 1, where it may be permitted to drip from the drip-tube.

In operation the valve 9 is turned to close the outlet 8. The screw-cap 6 is then removed and the reservoir filled. The screw-cap 6 is then replaced and the valve 9 opened. The liquid will then be permitted to escape through the outlet 8 into the dispensing-cup until it reaches a height sufficient to close the handle end of the air-tube 7. The dispensing fluid will be drawn by capillary attraction by the wicks 19 and 21 so as to saturate the said wicks. The wick 19 will diffuse the disinfectant through the perforated portion 3 of the casing, and the wick 21 will cause some of fluid to drip onto the bottom of the casing 1, where it is permitted to escape through the drip-tube in small quantities. When the level of the fluid within the cup is drawn out to a predetermined level, air will be admitted to the interior of the reservoir through the air-tube 7, thus permitting a new supply of the fluid to flow from the reservoir through the outlet 8 into the dispensing-cup.

When so desired, the reservoir may be removed from the dispensing-cup by unscrewing the plug 18 from the screw-threaded socket 17.

It will be seen that while the reservoir and cup are made removable from the casing, still the reservoir may be readily filled while within the casing by manipulating the handle 10 of the valve and the screw-cap 6.

It is evident that the apparatus may be made in various shapes and sizes without departing from the spirit and scope of my invention, and it is also evident that slight changes might be resorted to in the construction, form, and arrangement of the several parts. Hence I do not wish to limit myself strictly to the structure herein set forth; but What I claim is—

1. In a disinfecting apparatus, a reservoir, a dispensing-cup having its walls extended up above the bottom of the reservoir and means for removably securing the reservoir within the cup comprising a screw-threaded socket projecting upwardly from the bottom of the cup and a screw-threaded plug projecting downwardly from the bottom of the reservoir.

2. In a disinfecting apparatus, a disinfecting-fluid reservoir having a filling-hole in its top, an air-tight stopper therefor, an air-supply tube leading from its bottom to a point in proximity to its top, an outlet through its bottom and a valve operated from the exterior of the reservoir for opening and closing the said outlet.

3. In a disinfecting apparatus, a reservoir having an air-tube projecting upwardly from its bottom to a point in proximity to its top, an outlet-tube, a valve for opening and closing the mouth of the outlet-tube and a valve-handle exterior to the top of the reservoir and having a screw-threaded engagement with the said top.

4. In a disinfecting apparatus, a reservoir having an air-tube extending from its bottom upwardly to a point in proximity to its top, an outlet-tube, a valve therefor having its rod projected up through the top of the reservoir, an operating-handle for the valve-rod and an inclosing tube for the valve-rod projecting downwardly from the top of the reservoir toward the valve serving as a guide for the said valve-rod.

In testimony that I claim the foregoing as my invention I have signed my name, in presence of two witnesses, this 18th day of October, 1902.

FRANKLYN M. WISE.

Witnesses:
FREDK. HAYNES,
HENRY THIEME.